US009757990B2

(12) United States Patent
Abarotin et al.

(10) Patent No.: US 9,757,990 B2
(45) Date of Patent: Sep. 12, 2017

(54) TIRE HAVING DIAGONAL RIBS WITH TRAILING EDGE SIPING

(71) Applicants:Victor Abarotin, Greer, SC (US);
Daniel McEachern Hicks, Greenville, SC (US)

(72) Inventors: Victor Abarotin, Greer, SC (US);
Daniel McEachern Hicks, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 149 days.

(21) Appl. No.: 14/429,030

(22) PCT Filed: Sep. 23, 2013

(86) PCT No.: PCT/US2013/061178
§ 371 (c)(1),
(2) Date: Mar. 18, 2015

(87) PCT Pub. No.: WO2014/052236
PCT Pub. Date: Apr. 3, 2014

(65) Prior Publication Data
US 2015/0224828 A1 Aug. 13, 2015

Related U.S. Application Data

(60) Provisional application No. 61/706,923, filed on Sep. 28, 2012.

(51) Int. Cl.
*B60C 11/04* (2006.01)
*B60C 11/12* (2006.01)
(Continued)

(52) U.S. Cl.
CPC ...... *B60C 11/1236* (2013.01); *B60C 11/0302* (2013.01); *B60C 11/0304* (2013.01);
(Continued)

(58) Field of Classification Search
CPC ............. B60C 11/0302; B60C 11/0304; B60C 11/1236; B60C 11/124; B60C 2011/1254; B60C 2011/129
(Continued)

(56) References Cited

U.S. PATENT DOCUMENTS

| 3,000,421 A | 9/1961 | Hack et al. |
| 4,986,325 A | 1/1991 | Matsumoto |

(Continued)

FOREIGN PATENT DOCUMENTS

| DE | 102004008034 | 9/2005 |
| EP | 0194069 | 9/1986 |

(Continued)

OTHER PUBLICATIONS

Extended European Search Report, for Application No. 13840795.2, dated May 3, 2016, 9 pages.
(Continued)

*Primary Examiner* — Timothy Kennedy
(74) *Attorney, Agent, or Firm* — Dority & Manning, P.A.

(57) ABSTRACT

A tire is provided having a tread region that includes continuous ribs which extend diagonally across the transverse direction of the tire. Partial sipes are provided at the trailing edges of the ribs. Full sipes can also be provided with the partial sipes. The ribs may form various patterns such as e.g., an S-shaped pattern, chevron pattern, and others. The tire provides improved traction performance over non-diagonal ribs while still providing desirable rolling resistance performance and control of irregular wear.

17 Claims, 13 Drawing Sheets

(51) Int. Cl.
*B60C 11/03* (2006.01)
*B60C 11/13* (2006.01)

(52) U.S. Cl.
CPC ............ *B60C 11/04* (2013.01); *B60C 11/124* (2013.01); *B60C 11/1259* (2013.01); *B60C 11/13* (2013.01); *B60C 2011/0374* (2013.01); *B60C 2011/129* (2013.01); *B60C 2011/1209* (2013.01); *B60C 2011/1254* (2013.01)

(58) Field of Classification Search
USPC .................................................. 152/209.18
See application file for complete search history.

(56) References Cited

U.S. PATENT DOCUMENTS

| | | | |
|---|---|---|---|
| 5,363,895 | A | 11/1994 | Wells et al. |
| 6,834,695 | B2 | 12/2004 | Tomita |
| 7,134,467 | B2 | 11/2006 | Neubauer et al. |
| 7,849,895 | B2 | 12/2010 | Fukunaga |

FOREIGN PATENT DOCUMENTS

| | | |
|---|---|---|
| EP | 0485884 | 5/1992 |
| EP | 0590375 | 4/1994 |
| EP | 0958945 | 11/1999 |
| EP | 1 930 185 | 6/2008 |
| EP | 2 230 101 | 9/2010 |
| GB | 2229974 | 10/1990 |
| GB | 2306924 | 5/1997 |
| JP | 3139404 | 6/1991 |
| JP | 2006 321342 | 11/2006 |
| WO | WO 99/17943 | 4/1999 |
| WO | WO 2011098406 | 8/2011 |
| WO | WO 2012/002947 | 1/2012 |

OTHER PUBLICATIONS

PCT International Search Report for PCT/US2013/061178, dated Feb. 19, 2014.

TIRE HAVING DIAGONAL RIBS WITH TRAILING EDGE SIPING

PRIORITY CLAIM

This application claims the benefit of priority of U.S. Provisional Patent Application No. 61/706,923, filed Sep. 28, 2012, which is incorporated herein by reference for all purposes.

FIELD OF THE INVENTION

The subject matter of the present disclosure relates generally to a tire having ribs that fully or partially extend diagonally across the transverse direction of the tread region and have a plurality of sipes defined in the trailing edge of the ribs.

BACKGROUND OF THE INVENTION

Tires having continuous ribs oriented parallel to the longitudinal direction of the tread are commonly used on e.g., commercial vehicles. A common placement of such designs on commercial vehicles can include the steer tire positions on a commercial truck. Ribs constructed in such a manner can provide rolling resistance performance that is much better than e.g., tread patterns having blocks or non-continuous ribs. Improved rolling resistance performance can provide better fuel efficiency, a particularly desirable feature in view of increasing fuel costs.

One challenge with ribs oriented parallel to the longitudinal direction, however, is relatively poor traction performance. This characteristic results from e.g., the lack of transverse edges that provide grip as the tire rolls over the road surface. Thus, tires having such rib construction are typically not used on e.g., the drive tires of commercial vehicles. Instead, as stated above, such tires are commonly placed in the steer positions where a high level of longitudinal traction is not required.

Additionally, such longitudinally oriented ribs are subject to irregular wear. As used herein, "irregular wear" means that the wearing of the ribs is not uniform from rib to rib. Such irregular wear can e.g., shorten the life of the tread and create unwanted vibrations as the tire rolls across the road surface. Although siping can be added to reduce such irregular wear, such can also adversely affect rolling resistance performance.

Accordingly, a ribbed tire that provides desired rolling resistance and traction performance would be useful. More particularly, a tire that can provide the rolling resistance performance of a continuous rib while also providing needed traction performance would be beneficial. Such a tire that can also be provided with features for preventing or reducing irregular wear would also be very useful.

SUMMARY OF THE INVENTION

The present invention provides a tire having a tread region that includes continuous ribs that fully or partially extend diagonally across the transverse direction of the tire. Partial sipes are provided at the trailing edges of the ribs. Full sipes can also be provided along with the partial sipes. The ribs may form various patterns such as e.g., an S-shaped pattern, chevron pattern, and others. The tire provides improved traction performance over non-diagonal ribs while still providing desirable rolling resistance performance and control of irregular wear. Additional objects and advantages of embodiments of the invention will be set forth in part in the following description, or may be apparent from the description, or may be learned through practice of the invention.

In one exemplary embodiment, the present invention provides a tire defining longitudinal, radial, and transverse directions. The tire includes a pair of opposing shoulders spaced apart along the transverse direction. A tread region extends between the shoulders. The tread region includes a plurality of ribs separated by grooves and extending from one of the shoulders to the other of the shoulders. Each of the ribs has a rib length and a rib width. Along the rib length, each of the ribs forms a non-zero angle $\alpha$ from the longitudinal direction. Relative to the direction of tire rotation, each of the ribs includes a leading edge and a trailing edge—where the leading edge is the edge that rolls through the contact patch first. The trailing edge defines a plurality of partial sipes spaced apart along the length of the rib. The partial sipes have a sipe length SL that is less than the rib width. The leading edge does not have any partial sipes.

In another exemplary embodiment, the present invention provides a tire defining a centerline and defining longitudinal and transverse directions. The tire includes a pair of opposing shoulders spaced apart along the transverse direction. A tread region extends between the shoulders. The tread region includes a first plurality of ribs separated by grooves and extending from one of the shoulders to substantially the centerline of the tread region. A second plurality of ribs is also separated by grooves and extends from another of the shoulders to substantially the centerline of the tread region so as to approach the first plurality of ribs. Each of the first plurality and second plurality of ribs have a rib length and a rib width. The first plurality of ribs forms a non-zero, positive angle $+\alpha_1$ from the longitudinal direction along their rib length. The second plurality of ribs forms a non-zero, negative angle $-\alpha_2$ from the longitudinal direction along their rib length. Each of the first and second plurality of ribs includes a leading edge and a trailing edge. Each trailing edge defines a plurality of partial sipes spaced apart along the length of the rib. The partial sipes have a sipe length SL that is less than the rib width. The leading edge does not have any partial sipes.

In still another exemplary embodiment, the present invention provides a tire that defines longitudinal, radial, and transverse directions. The tire includes a pair of opposing shoulders spaced apart along the transverse direction. A tread region extends between the shoulders. The tread region has a rolling tread width RTW. The tread region includes a plurality of ribs separated by grooves and extending along the tread region. Each of the ribs having a rib length RL and a rib width RW. Along the rib length RL each of the ribs forms a non-zero angle $\alpha$ from the longitudinal direction and the value of $RL*\cos(\alpha)$ is about 40 percent of the rolling tread width RTW or greater. Each of the ribs includes a leading edge and a trailing edge. The trailing edge defines a plurality of partial sipes spaced apart along the length of the rib. The partial sipes have a sipe length SL that is less than the rib width RW. The leading edge does not have any partial sipes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures denotes same or similar features.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 1:
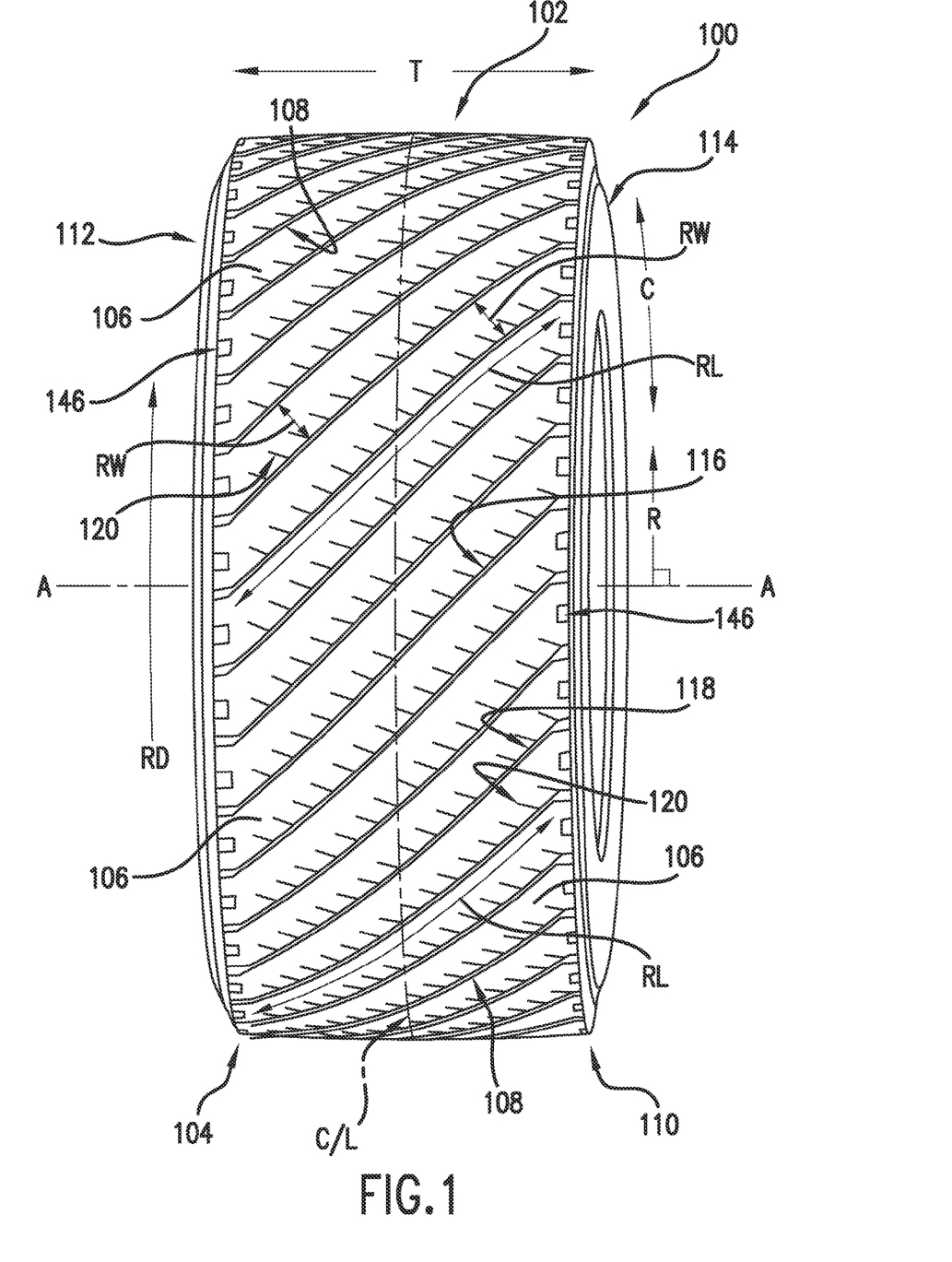
FIG. 1 illustrates a perspective view of an exemplary embodiment of a tire of the present invention.

FIG. 1 illustrates an exemplary embodiment of a tire 100 constructed according to the present invention. Tire 100 defines a transverse direction T that is parallel to the axis of rotation A. A radial direction R extends from the axis of rotation A and is perpendicular thereto. Tire 100 also defines a longitudinal direction L (FIGS. 6 and 7) that is perpendicular to both the transverse direction T and radial direction R at any point along the tread region 102 of tire 100. Longitudinal direction L is also tangent to a circumferential direction C of tire 100 at any point along tread region 102.

Tire 100 includes a pair of opposing shoulders 104 and 110 spaced apart from each other along transverse direction T. Tread region 102 extends between shoulders 104 and 110 along transverse direction T and also extends circumferentially around tire 100. Tread region may include e.g., notches 146 of other features along each shoulder of tire 100. Tire 100 also includes a pair of sidewalls 112 and 114 on opposing sides of tire 100.

Tread region 102 includes a plurality of ribs 106 separated by grooves 108. Each of the ribs 106 has a rib length RL and a rib width RW. Ribs 106 each extend diagonally from one shoulder 104 to the other shoulder 110. Although shown for this embodiment as uninterrupted across the entire rib length RL, the present invention includes exemplary embodiments where one or more ribs may be interrupted along their rib length RL by grooves or other features.

Figure 2:
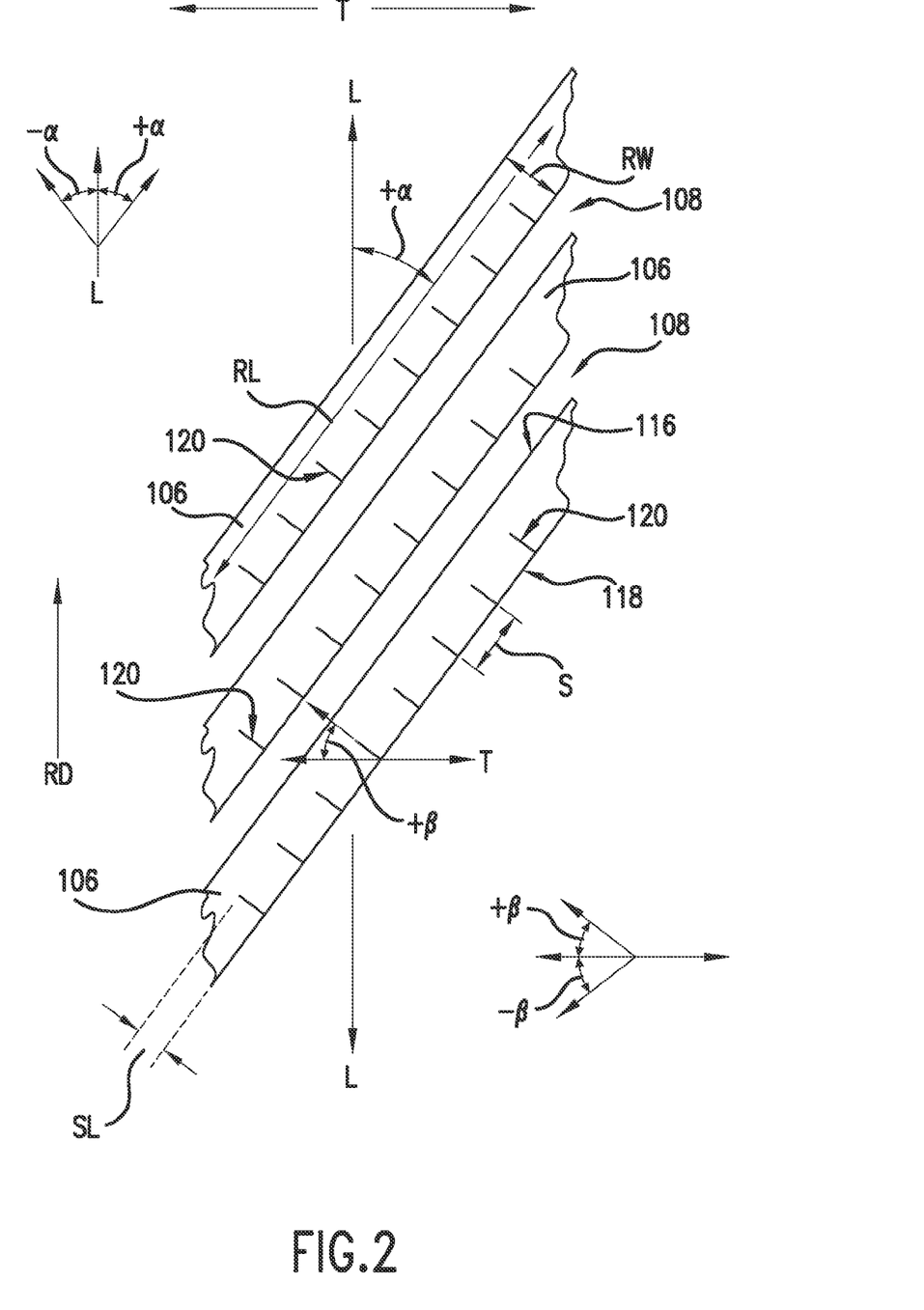
FIG. 2 is a close up, perspective view of a portion of the tread region of the exemplary embodiment of FIG. 1.

As shown in FIGS. 1 and 2, each rib 106 has a rib length RL that forms a non-zero angle α (45 degrees in FIG. 1 and 20 degrees in FIG. 5) from the longitudinal direction L. For example, in certain exemplary embodiments, the absolute value of angle α is in the range of about 10 degrees to about 60 degrees. In still other embodiments, the absolute value of angle α is about 20 degrees or about 60 degrees. It should be noted that in FIG. 1 as viewed by the reader, ribs 106 extend diagonally upward from left to right and provide for a positive angle α from the longitudinal direction L, which can be denoted as +α as shown in FIG. 1. However, in other embodiments, ribs 106 extend downwardly from left to right and still form a non-zero angle α from the longitudinal direction L. In such instance, angle α will provide for a negative angle α, which can be denoted as -α as shown in FIG. 2. Regardless of which directions for ribs 106 are used, the absolute value of angle α is in the range of about 10 degrees to about 60 degrees for these exemplary embodiments as previously stated.

Figure 3:
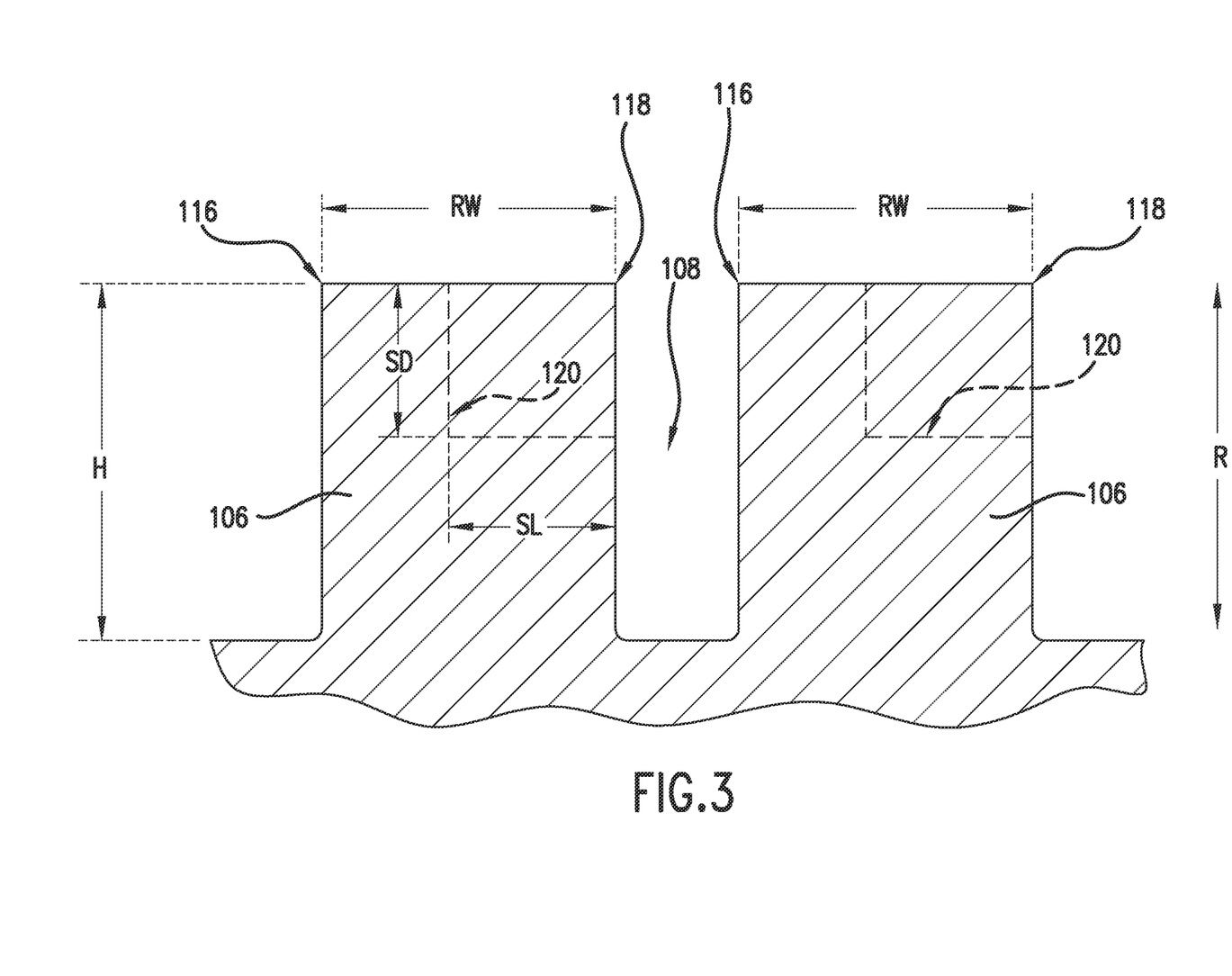
FIG. 3 is a cross-sectional view of a portion of the tread region of the exemplary embodiment of FIG. 1.

Continuing now with FIGS. 1, 2, and 3 ribs 106 each have a leading edge 116 and a trailing edge 118 as defined by rolling direction RD, where the leading edge 116 is the first edge to enter the contact patch as the tire rolls and the vehicle moves in a forward direction. More particularly, the configuration of ribs 106 provides tire 100 with a directional tread pattern. As such, when a vehicle equipped with tire 100 is moving in a forward direction, leading edge 116 of a rib 106 contacts the road surface before trailing edge 118 as tire 100 moves along rolling direction RD and each rib 106 moves through the contact patch.

Trailing edge 118 of each rib 106 defines a plurality of partial sipes 120 that are spaced apart along rib length RL. Partial sipes 120 are "partial" meaning they each have sipe length SL shorter than rib width RW such that they do not extend fully across rib width RW of rib 106. Each partial sipe 120 is spaced apart along the direction of rib length RL from an adjacent partial sipe 120 by a spacing S. Each partial sipe 120 has a sipe depth SD. For this exemplary embodiment, spacing distance S is less than about 1.5 times sipe depth SD. In turn, sipe depth SD is at least about 50 percent of the height H of ribs 106 along the radial direction R. (FIG. 3). Partial sipes 120 also have a sipe length SL that is at least about 50 percent of the spacing S between partial sipes 120.

Referring specifically to FIG. 2, partial sipes 120 each form an acute angle β from the transverse direction T. Angle β has an absolute value in the range of about zero degrees to about 45 degrees. It should be noted that in FIG. 2 as viewed by the reader, ribs 106 extend diagonally upward from left to right such that angle β has a positive value denoted +β. However, in other embodiments, ribs 106 extend downwardly from left to right and will still form an acute angle -β from the transverse direction T having an absolute value in the range of about zero degrees to about 45 degrees.

Figure 4:
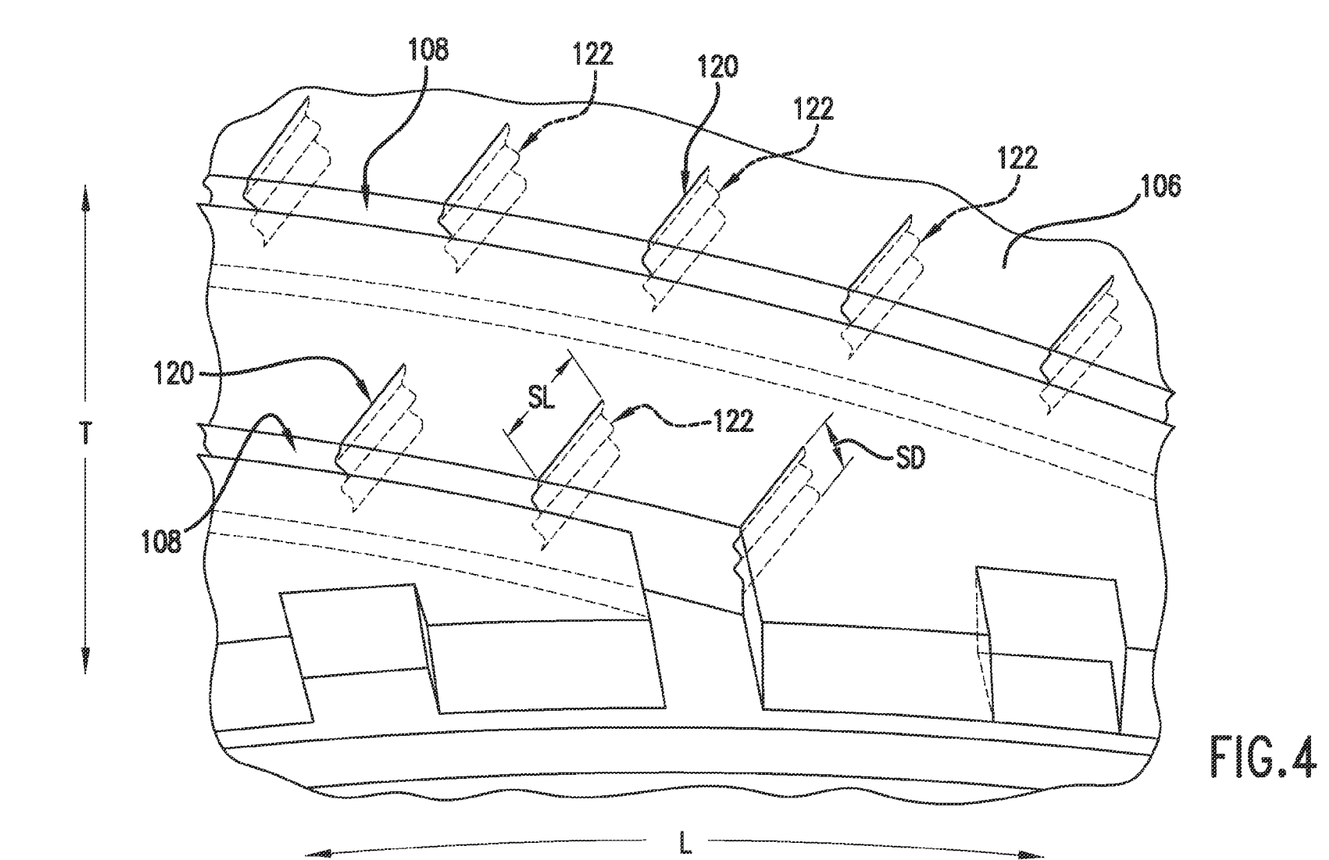
FIG. 4 is a close-up, perspective view of a portion of an exemplary embodiment of a tread of the present invention with hidden features shown in dashed lines.

Along sipe depth SD, partial sipes 120 can be straight as shown in FIG. 3. Alternatively, various features may be added to assist with durability, wear rate, and irregular wear in other embodiments of the invention. For example, as shown in FIG. 4, sipes 120 could include one or more waves or undulations 122 along radial direction R. Other types of shear locking features may be used as well. Undulations or other shear locking features may also be provided along sipe length SL.

Figure 5:
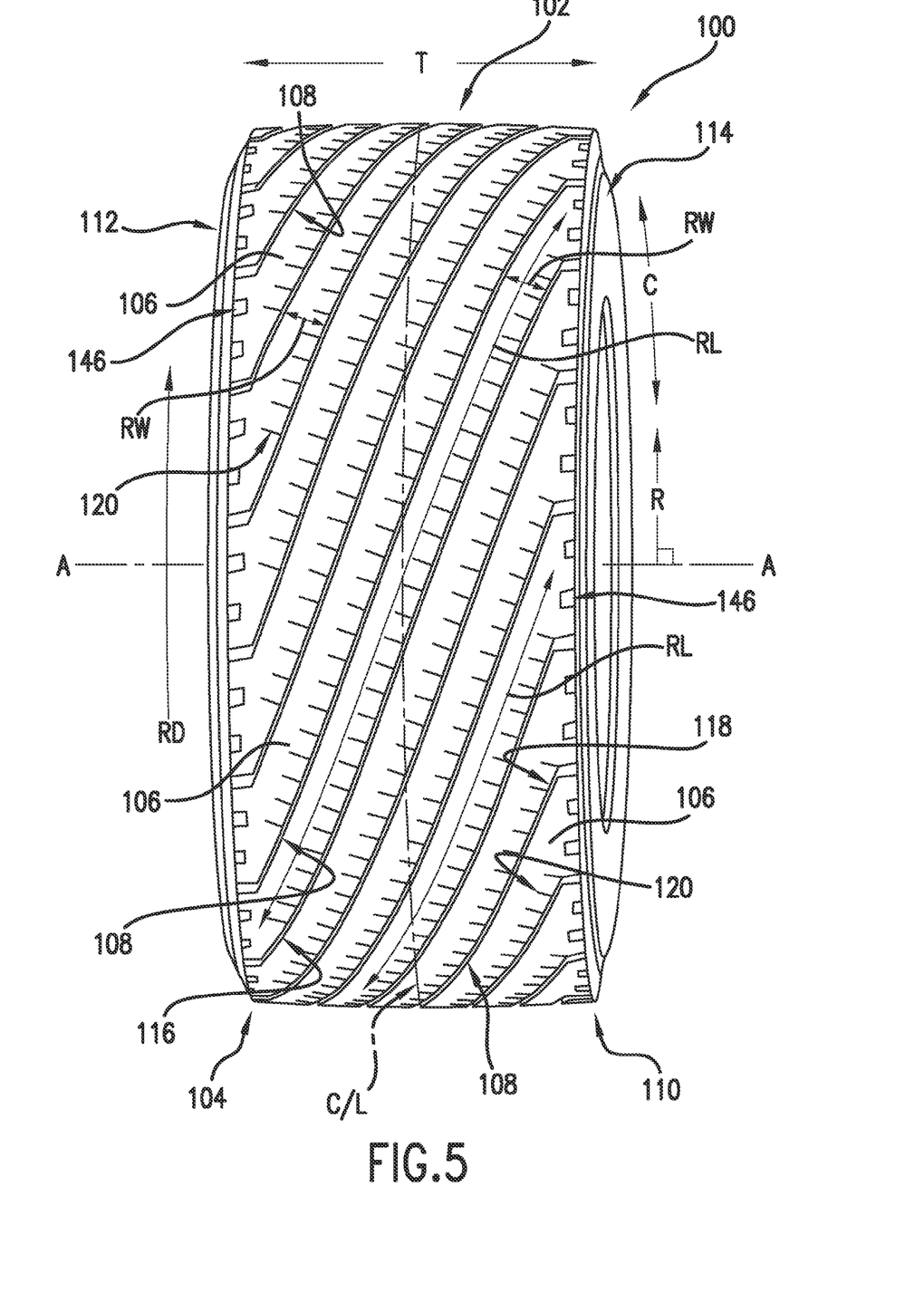
FIGS. 5, 6, 7, and 8 are perspective views of additional exemplary embodiments of the present invention.

A variety of shapes and/or orientations may be used with the diagonal ribs 106 that will provide tire 100 with different appearances. In FIG. 1, the diagonal ribs 106 of tire 100 are relatively straight along rib length RL. FIG. 5 provides another exemplary embodiment of tire 100 in which ribs 106 are provided at a different angle α from the longitudinal direction L. Other configurations may also be used. For example, ribs 106 may be provided with a slight curvature so to create an overall corkscrew or S-shape for each rib 106.

Figure 6:
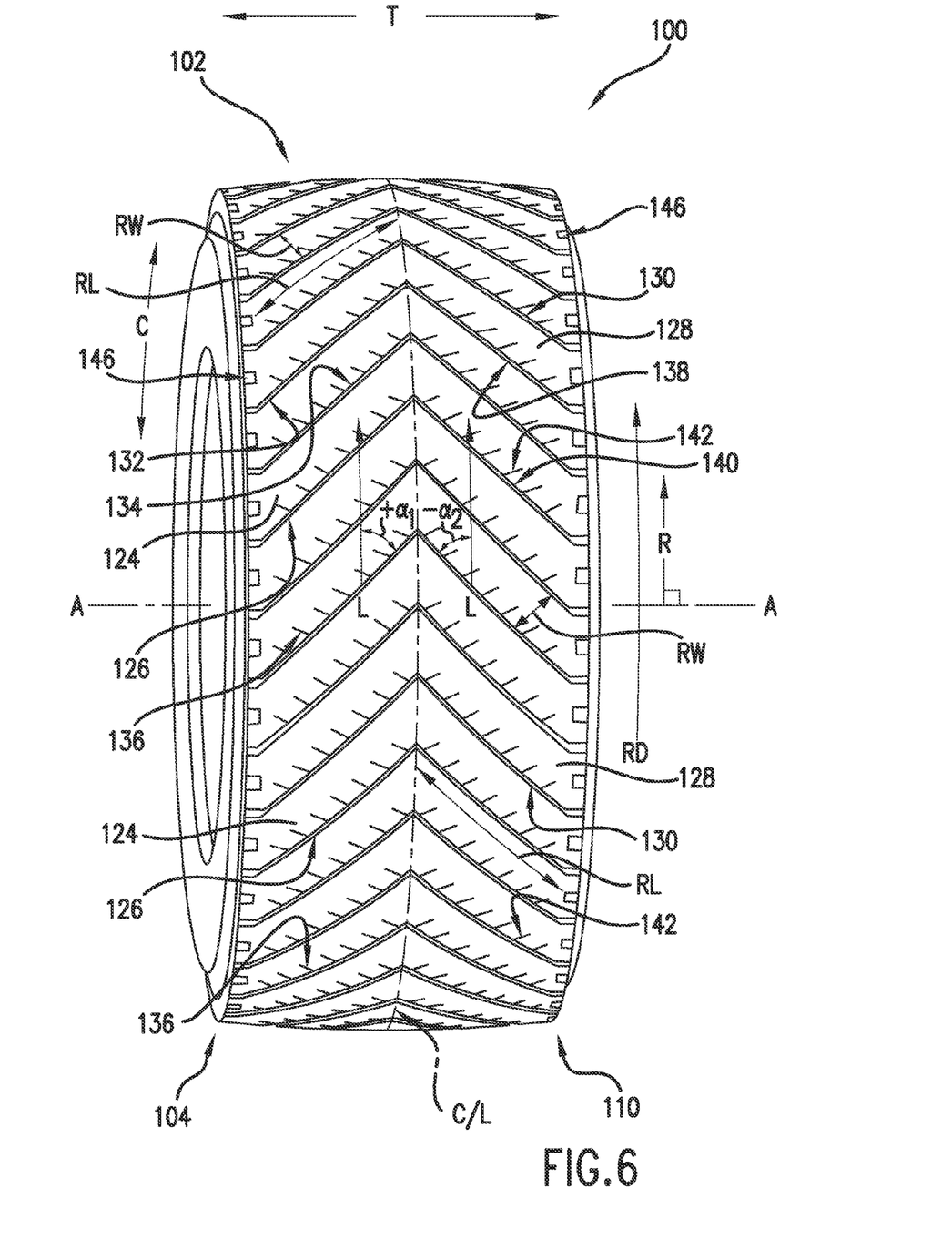
Figure 7:
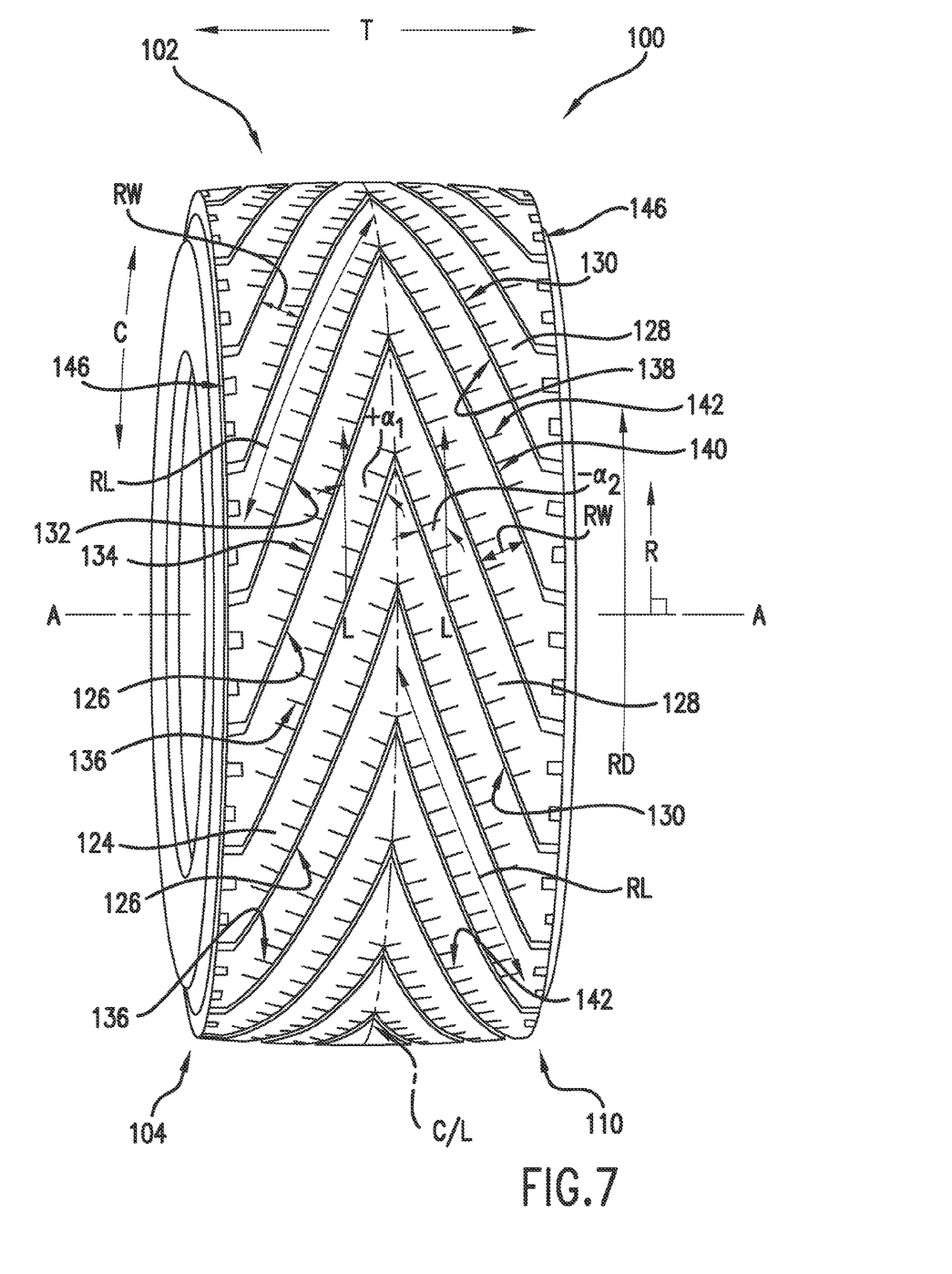
Figure 8:
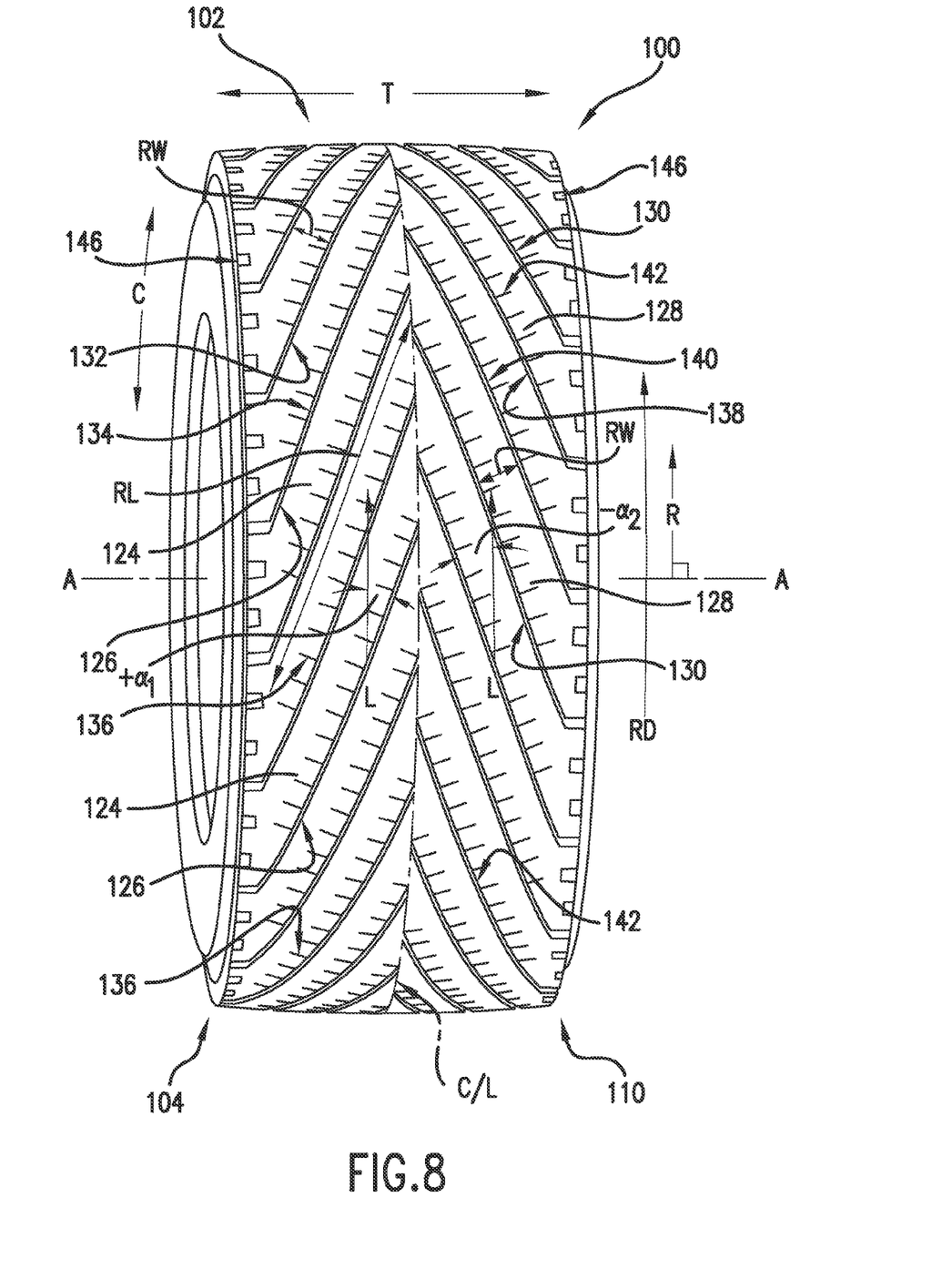

FIGS. 6, 7, and 8 each show additional exemplary embodiments of tire 100 where diagonal ribs are arranged to create chevron patterns. More particularly, for each embodiment, tire 100 includes a first plurality of ribs 124 separated by grooves 126 and extending from shoulder 104 to substantially the centerline C/L of tread region 102. Tire 100 also includes a plurality of ribs 128 separated by grooves 130 and extending from the other shoulder 110 to substantially the centerline C/L of tread region 102 so as to meet ribs 124. For the embodiments of tire 100 shown in FIGS. 6 and 7, grooves 126 and 130 meet at centerline C/L whereas in FIG. 8 grooves 126 and 130 are offset from each other at centerline C/L. In still other embodiments of the invention, grooves 126 and 130 may approach each other without necessarily touching and/or without meeting only at the centerline C/L.

First plurality of ribs 124 each have a rib length RL and a rib width RW. Along their rib length RL, ribs 124 are positioned at a non-zero, positive angle +α$_1$ from the longitudinal direction L. Second plurality of ribs 128 each have a rib length RL and a rib width RW. Along their rib length RL, second plurality of ribs 128 are positioned at a non-zero, negative angle −α$_2$ from the longitudinal direction L. For each exemplary embodiment shown, the absolute value of angle α$_x$ for ribs 124 and 128 is identical. However, in other exemplary embodiments of the invention, the absolute values of α$_1$ and α$_2$ may be different or non-equal. Comparing FIGS. 6 and 7, the absolute value used for angle α is greater in FIG. 7. Other values may be used to provide a different appearance. As with the exemplary embodiment of FIG. 1, the absolute value of angle α is in the range of about 10 degrees to about 60 degrees.

In a manner also similar to the exemplary embodiment of FIG. 1, ribs 124 each have a leading edge 132 and a trailing edge 134. A plurality of partial sipes 136 are defined by trailing edge 134 in a manner similar to partial sipes 120. Ribs 128 each have a leading edge 138 and a trailing edge 140. A plurality of partial sipes 142 are defined by trailing edge 140 in a manner similar to partial sipes 120 but with an opposite orientation. For each of the embodiments of FIGS. 6, 7, and 8, partial sipes 136 and 142 have a spacing S, a sipe depth SD, and a sipe width SW as previously described with regard to the embodiment of FIG. 1. Similarly, partial sipes 136 and 142 form an acute angle β (+β or −β) from the transverse direction, wherein angle β has an absolute value in the range of about 0 to about 45 degrees.

Chevron patterns other than what is shown in e.g., FIGS. 6, 7, and 8 may be used as well for the ribs of tire 100. For example, the chevron pattern may be oriented 90 degrees from what is shown in these figures. U.S. Design Pat. No. 352,486 provides an example of such an orientation.

Figure 9:
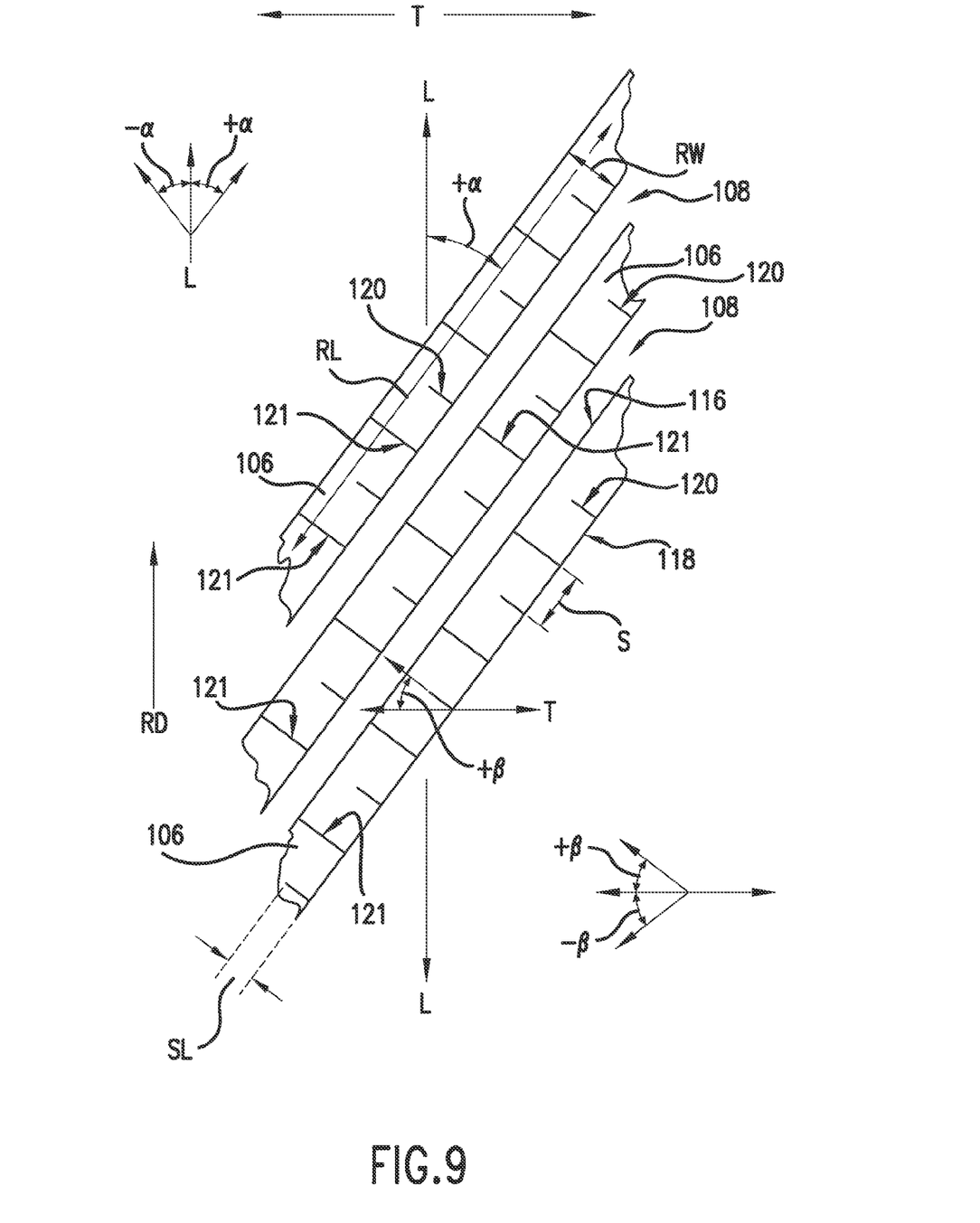
FIG. 9 is a close up, perspective view of a portion of the tread region of another exemplary embodiment of the present invention.
Figure 13:
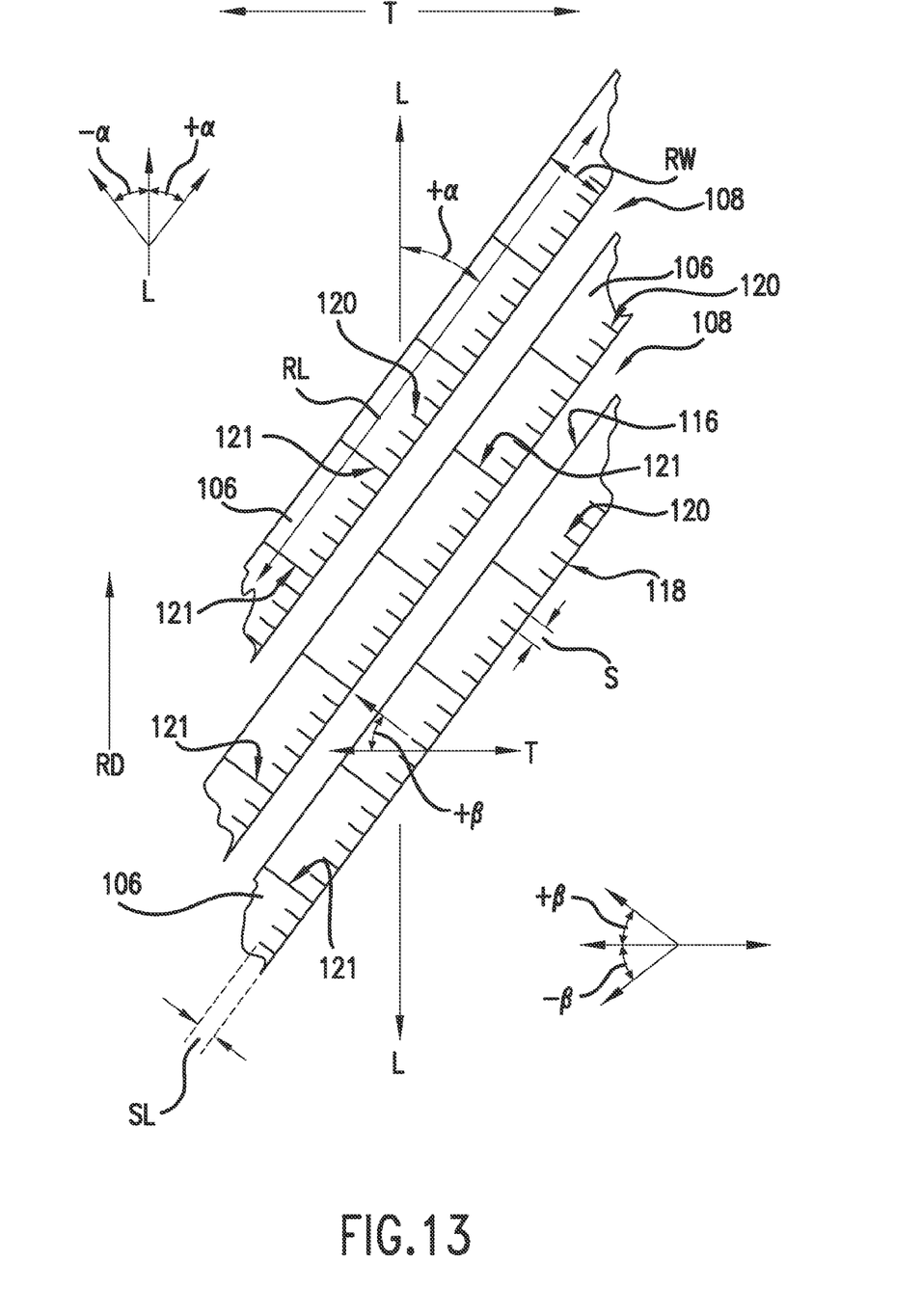
FIG. 13 is a close up, perspective view of a portion of the tread region of another exemplary embodiment of the present invention.

The above description has provided examples of tire 100 with partial sipes—i.e. sipes extending from the trailing edge and partially across the width of a respective rib. However, the present invention includes full sipes as well. For example, FIG. 9 provides a view similar to the embodiment of FIG. 2 except partial sipes 120 alternate with full width sipes 121. For sipes 121, aspects such as the sipe depth SD, angle β, and undulations can be provided in a manner similar to that previously described with regard to the embodiment of FIGS. 1 and 2. Patterns other than alternating between full width sipes 121 and partial sipes 120 may also be used. For example, FIG. 13 provides another exemplary embodiment for the tread of tire 100 in which multiple, partial sipes 120 are positioned between full width sipes 121 as shown.

The rib length RL for the exemplary embodiment of FIGS. 1 and 5 is such that ribs 106 extend substantially or completely across the rolling tread width RTW of tread region 102. In FIGS. 6, 7, and 8, rib length RL of ribs 124 or 128 extends only partially across the rolling tread width RTW such that rib length RL is less than that of the exemplary embodiments of FIGS. 1 and 5. As used herein, rolling tread width RTW is the width of the tread—as measured along transverse direction T—that is in contact with the ground surface as the tire moves through the contact patch. For all exemplary embodiments of the invention described above, the product of the rib length RL and the cosine of angle α is equal to, or greater than, about 40 percent of the rolling tread width RTW. This can also be expressed as RL*cos(α) is the same, or greater than, about 40 percent of the rolling tread width RTW.

Rolling resistance measurements were conducted for five different tires A through E constructed according to various exemplary embodiments of the invention as identified in TABLE I below. Rolling resistance was measured on a drum at maximum nominal loads and pressures at about 90 kilometers per hour. All tires had a tread having the same void volume ratio. The notches referenced in Table I are notches such as notches 146 shown in FIG. 1 and located on the exterior shoulders of tire 100. For tires A through D, each tire was tested without notches or partial sipes, with notches but not partial sipes, and with notches and partial sipes. RR as referenced in Table I refers to rolling resistance coefficients expressed in values of Kg/T (kilograms of resistance force/ton of load).

TABLE 1

|  | Tire A | Tire B | Tire C | Tire D | Tire E |
| --- | --- | --- | --- | --- | --- |
| Rib description | α = 20°/ CorkScrew | α = 45°/ CorkScrew | /α/ = 25°/ Chevron | /α/ = 45°/ Chevron | 7 straight ribs |
| RR with no notches or sipes | 3.62 | 3.41 | 3.62 | 3.54 | 3.67 |
| RR with notches but no sipes | 3.72 | 3.5 | 3.81 | 3.72 |  |
| RR with notches and 20 mm sipes | 3.68 | 3.55 | 3.85 | 3.72 |  |

As shown, for tires A through D, an unexpected result occurs in that the addition of partial sipes did not increase rolling resistance RR.

Figure 10:
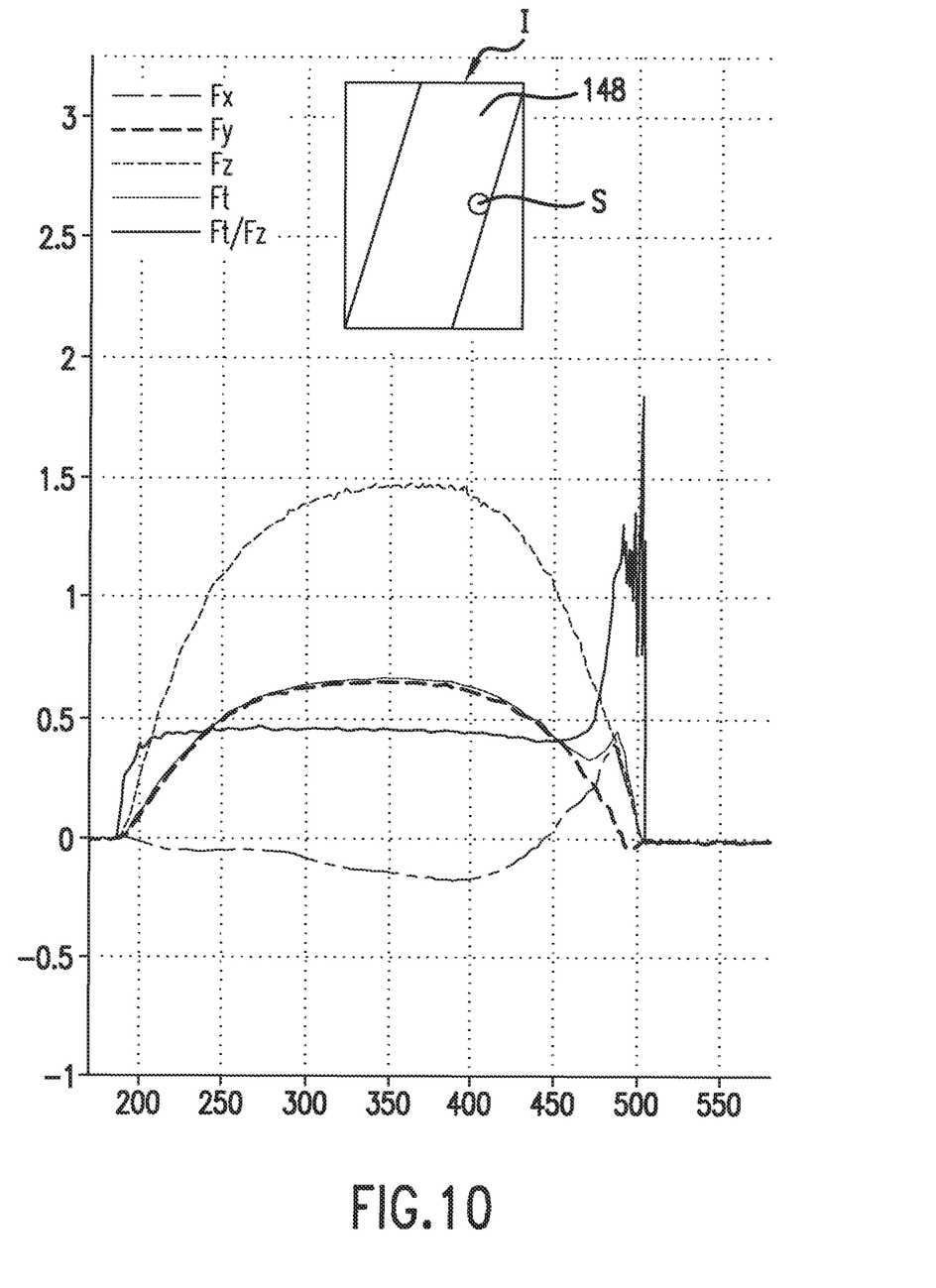
FIGS. 10-12 are graphs of certain data as will be further described below.
Figure 11:
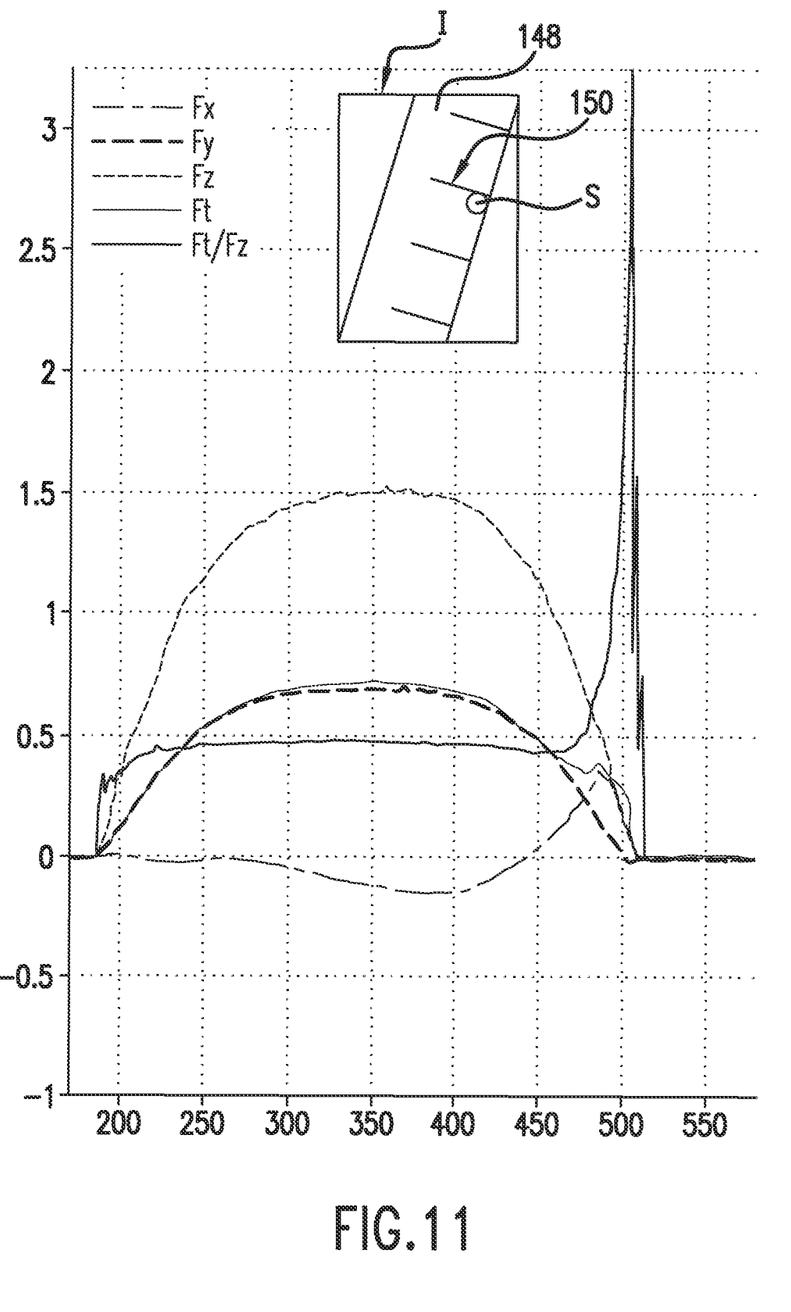
Figure 12:
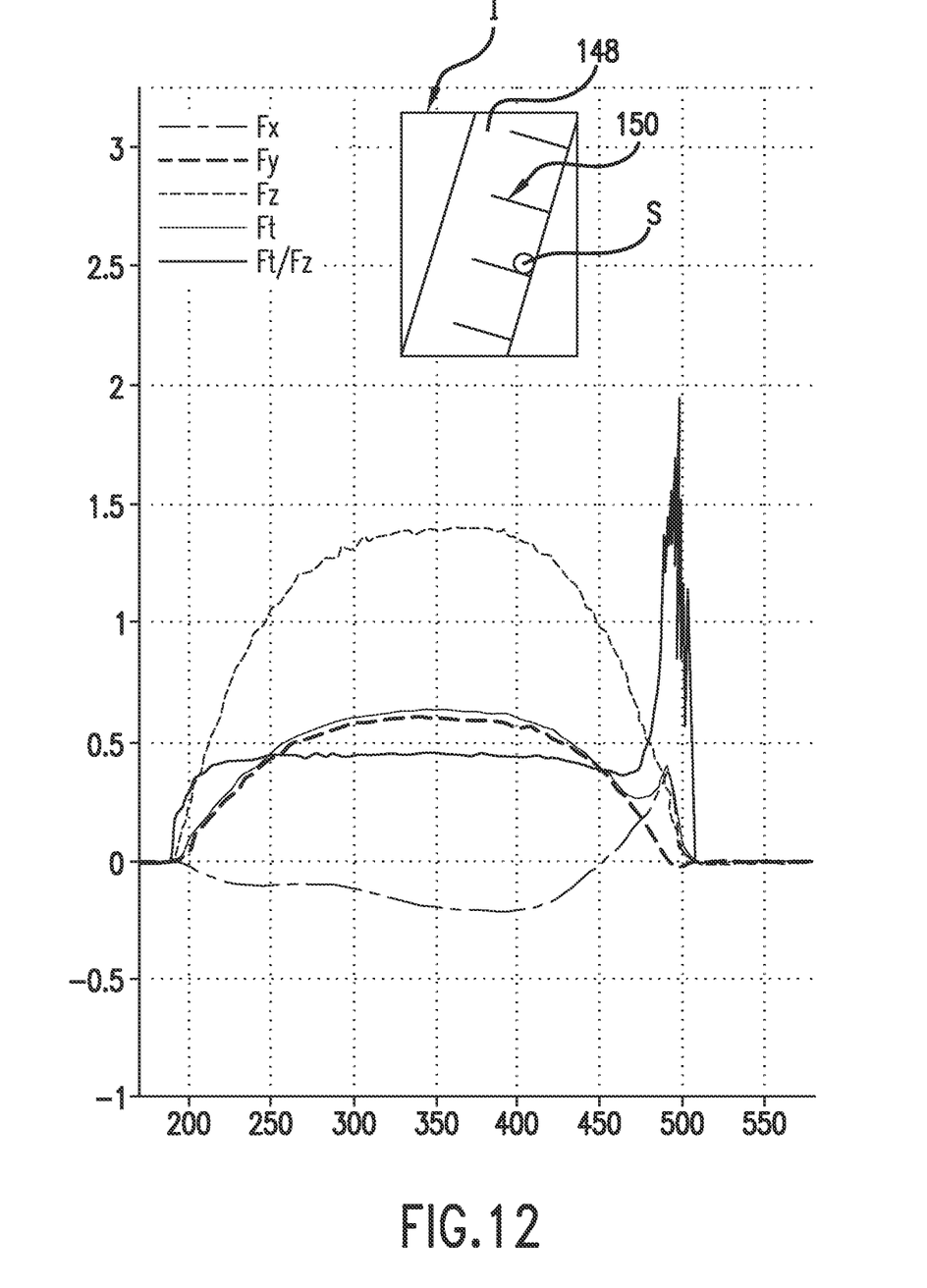

FIGS. 10, 11 and 12 provide graphs of for contact force measurements taken along the trailing edge of a rib of an exemplary embodiment of a tire of the present invention while the tire was submitted to a driving torque. Each figure includes an inset I depicting the location of sensor S. FIG. 10 represents a plot for a tire having ribs 148 without siping. FIGS. 11 and 12 represent plots for a tire having ribs 148 with partial sipes 150 with a sensor S positioned on different sides of partial sipe 150 as shown. In these figures, Fx represents a force along longitudinal direction L, Fy represents a force along the transverse direction T, and Fz represents a force normal to the road surface. As shown in FIGS. 10, 11, and 12, the addition of partial sipe 150 leads to a reduction of contact force and stress in the kickout area—particularly in the area behind the sipe as shown in FIG. 11.

15 mm concentrated the wear reduction even more along the trailing edge and had a more uniform wear along the leading edge.

FEA analysis also revealed that full width sipes can be used to improve the overall wear rate while trailing edge sipes can be used to target wear rate reduction at the trailing edge. Ribs which combine both full and partial width sipes can be used to accomplish both of these effects. Accordingly, FEA was used to analyze a diagonal rib (with α of 20 degrees) having full width siping and ribs having both full and partial siping with sipe lengths SL and spacing S as indicated in Table II below.

TABLE II

| | Solid rib | SW = 20 mm, S = 30 mm | SW = full, S = 30 mm | SW = 20 mm, S = 15 mm | SW = combinations of full width and 10 mm, S = 15 mm | SW = combination of full width and 7.5 mm, S = 15 mm |
|---|---|---|---|---|---|---|
| Driving | 100 | 86 | 66 | 81 | 68 | 70 |
| Braking | 91 | 85 | 85 | 95 | 88 | 93 |
| 50/50 braking/driving | 97 | 87 | 77 | 90 | 79 | 83 |
| 10/90 braking/driving | 99 | 87 | 68 | 83 | 70 | 72 |

By using the ratio of tangential force divided by the normal force (Ft/Fz), a sliding potential can be represented by the duration this Ft/Fz ratio exceeds some given threshold. This threshold would be akin to the coefficient of friction and would depend on many factors such as the type of ground, tread compound, temperature, sliding speed, etc. For purposes of further describing the invention, a threshold of 0.8 was selected for analysis. Multiplying this sliding potential by the Fz force gives a value that would be roughly proportional to the frictional dissipated energy and can be viewed as a form of a wear indicator. Accordingly, the product of the sliding length potential multiplied by force Fz measured for an exemplary embodiment of a tire having an angle α of twenty degrees for its diagonal ribs was determined.

Unexpectedly, the results indicated a benefit for partial sipes on the trailing edge for a driving torque condition. The lead edge of the rib showed a significant amount of wear potential under driving, free rolling, and braking conditions, but such was merely an edge effect that goes away in the first miles of wear and then stabilizes. Under the free rolling and braking conditions, no benefit was seen with the trailing edge sipes, which makes the design of the present invention more beneficial for the drive axle positions. However, importantly the trailing edge sipes showed no detrimental effects under these conditions, particularly under the braking conditions. This is a very good result because braking conditions are typically when abnormal wear can be initiated and propagated.

Finite element analysis (FEA) was also used to predict the wear of trailing edge sipes through modeling of a single rib having a rib width RW of 50 mm. As with above, frictional sliding was used as a wear indicator but was calculated from the FEA by the dot product of the displacement vector (sliding) and tangential force vector for each time step and summed for each node.

The FEA revealed that under driving torque, ribs with only partial sipes or ribs with both partial and full sipes will reduce the wear prediction at the trailing edge. Sipes having a sipe length SL of 20 mm reduced the wear only at the trailing edge whereas the full width sipes showed a tendency to reduce wear of the overall rib. Smaller sipe spacings S of The values shown are percents relative to the solid rib having a width of 50 mm under driving torque conditions. A lower number represents a slower (i.e. better) wear rate. As shown, the full width siping without partial width siping provided the best overall wear performance for both driving and breaking A wear penalty appears when partial width siping is added to the trailing edge, but this penalty decreases as the use of the tire becomes dominated by a driving torque—indicating such design is best suited for drive axle applications. Even though full width siping alone appears to provide an improvement in wear life, it will negatively affect rolling resistance. However, the addition of partial sipes on the trailing edge provides an improvement to wear and irregular wear without negatively impacting rolling resistance.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A tire defining longitudinal, radial, and transverse directions, the tire comprising:
   a pair of opposing shoulders spaced apart along the transverse direction;
   a tread region extending between the shoulders, the tread region comprising
      a plurality of ribs separated by grooves and extending from one of said shoulders to the other of said shoulders, each of said ribs having a rib length and a rib width, wherein along the rib length each of said ribs forms a non-zero angle α from the longitudinal direction; and
      wherein each of said ribs comprises a leading edge and a trailing edge, the leading edge devoid of any partial sipes, the trailing edge defining a plurality of partial sipes spaced apart along the length of the rib by a distance S, the partial sipes having a sipe length SL that is less than the rib width, wherein the sipe length SL of the partial sipes is about 50 percent of the distance S or greater, and wherein the partial sipes form an acute, non-zero angle β from the transverse direction.

2. A tire as in claim 1, wherein the angle α has an absolute value in the range of about 10 degrees to about 60 degrees.

3. A tire as in claim 1, wherein the partial sipes have a sipe depth SD, and wherein said partial sipes have a sipe depth SD, and wherein the distance S is less than about 1.5 times the sipe depth SD.

4. A tire as in claim 1, wherein each rib has a rib width that is constant along the rib length.

5. A tire as in claim 1, wherein angle β has an absolute value in the range of about 0 to about 45 degrees.

6. A tire as in claim 1, wherein the ribs have a height H along the radial direction, and wherein the partial sipes have a sipe depth SD that is at least about 50 percent of height H.

7. A tire as in claim 1, wherein each of said ribs further defines a plurality of full sipes extending from the leading edge to the trailing edge of each said ribs, said full sipes spaced apart from each other and from the partial sipes along the rib length of said rib.

8. A tire as in claim 1, the tire further defining a centerline, wherein said plurality of ribs further comprises
a first plurality of ribs separated by grooves and extending from one of said shoulders to substantially the centerline of said tread region; and
a second plurality of ribs separated by grooves and extending from another of said shoulders to substantially the centerline said tread region so as to approach the first plurality of ribs;
wherein each of said first plurality and said second plurality of ribs having a rib length and a rib width, the first plurality of ribs forming a non-zero, positive angle $+\alpha_1$ from the longitudinal direction along their rib length, the second plurality of ribs forming a non-zero, negative angle $-\alpha_2$ from the longitudinal direction along their rib length.

9. A tire as in claim 8, wherein the angle $+\alpha_1$ is in the range of about 10 degrees to about 60 degrees and wherein the angle $-\alpha_2$ is in the range of about $-10$ degrees to about $-60$ degrees.

10. A tire as in claim 8, wherein the partial sipes have a sipe depth SD, and wherein said partial sipes are spaced apart along the rib lengths of the first and second plurality of ribs by a distance S that is less than about 1.5 times sipe depth SD.

11. A tire as in claim 8, wherein each rib has a rib width that is constant along the rib length.

12. A tire as in claim 8, wherein the partial sipes of said first and second plurality of ribs are at acute angle β from the transverse direction, wherein angle β has an absolute value in the range of about 0 to about 45 degrees.

13. A tire as in claim 8, wherein the first and second plurality of ribs have a height H along the radial direction, and wherein the partial sipes have a sipe depth SD that is at least about 50 percent of height H.

14. A tire as in claim 8, wherein each of said first and second plurality of ribs further defines a plurality of full sipes extending from the leading edge and to the trailing edge of each of said ribs, said full sipes spaced apart from each other and from the partial sipes along the rib length of each of said ribs.

15. A tire as in claim 1, wherein
said tread region has a rolling tread width RTW; and
a value of $RL*\cos(\alpha)$ for each of said plurality of ribs is about 40 percent of the rolling tread width RTW or greater, where RL denotes the rib length.

16. A tire as in claim 1, wherein each of said ribs forms a non-zero, positive angle $+\alpha$ from the longitudinal direction along their rib length, wherein each of the partial sipes along the trailing edge forms a non-zero, positive angle $+\beta$ from the transverse direction.

17. A tire as in claim 1, wherein each of said ribs forms a non-zero, negative angle $-\alpha$ from the longitudinal direction along their rib length, wherein each of the partial sipes along the trailing edge forms a non-zero, negative angle $-\beta$ from the transverse direction.

* * * * *